United States Patent
Gibbon et al.

(10) Patent No.: US 7,224,335 B2
(45) Date of Patent: May 29, 2007

(54) DMD-BASED IMAGE DISPLAY SYSTEMS

(75) Inventors: Michael A. Gibbon, Oakville (CA); Steven Read, Mississauga (CA); Samuel Ziheng Zhou, North York (CA); Sean Adkins, Vancouver (CA)

(73) Assignee: IMAX Corporation (CA)

( * ) Notice: Subject to any disclaimer, the term of this patent is extended or adjusted under 35 U.S.C. 154(b) by 90 days.

(21) Appl. No.: 10/220,626

(22) PCT Filed: Mar. 15, 2001

(86) PCT No.: PCT/CA01/00339

§ 371 (c)(1),
(2), (4) Date: Dec. 9, 2002

(87) PCT Pub. No.: WO01/69940

PCT Pub. Date: Sep. 20, 2001

(65) Prior Publication Data

US 2003/0142274 A1    Jul. 31, 2003

Related U.S. Application Data

(60) Provisional application No. 60/189,480, filed on Mar. 15, 2000.

(51) Int. Cl.
 *G09G 3/34* (2006.01)

(52) U.S. Cl. ......................... 345/84; 348/758

(58) Field of Classification Search ............ 353/29–31, 353/34, 37, 48, 49, 64; 345/690–694, 84–86; 348/758, 771; 359/618
See application file for complete search history.

(56) References Cited

U.S. PATENT DOCUMENTS

| | | | |
|---|---|---|---|
| 4,638,309 A | | 1/1987 | Ott |
| 5,157,523 A | * | 10/1992 | Yamagishi et al. ............ 349/8 |
| 5,272,473 A | * | 12/1993 | Thompson et al. ............ 345/7 |
| 5,278,652 A | * | 1/1994 | Urbanus et al. ............ 348/571 |
| 5,280,277 A | | 1/1994 | Hornbeck |
| 5,300,966 A | | 4/1994 | Uehira et al. |
| 5,386,253 A | | 1/1995 | Fielding |
| 5,400,093 A | | 3/1995 | Timmers |
| 5,490,009 A | | 2/1996 | Venkateswar et al. |
| 5,555,035 A | | 9/1996 | Mead et al. |

(Continued)

FOREIGN PATENT DOCUMENTS

CA    2227920    7/1999

(Continued)

OTHER PUBLICATIONS

Patent Abstracts of Japan, vol. 017, No. 387 (P-1576), Jul. 20, 1993 & JP 05 066501 A (Toshiba Corp), Mar. 19, 1993.

(Continued)

*Primary Examiner*—Amr A. Awad
*Assistant Examiner*—Steven Holton
(74) *Attorney, Agent, or Firm*—Kilpatrick Stockton LLP

(57) ABSTRACT

A projection system having a controller and a plurality of reflective SLMs operatively coupled to the controller to receive image data from the controller. The reflective SLMs are aligned in series to receive light form a light source and to reflect imaging light correlated to the image data.

31 Claims, 5 Drawing Sheets

U.S. PATENT DOCUMENTS

| | | | |
|---|---|---|---|
| 5,589,852 A | 12/1996 | Thompson et al. | |
| 5,592,239 A | 1/1997 | Hara et al. | |
| 5,612,753 A | 3/1997 | Poradish et al. | |
| 5,626,411 A | 5/1997 | Takahashi et al. | |
| 5,673,060 A | 9/1997 | Blaxtan et al. | |
| 5,686,939 A | 11/1997 | Millward et al. | |
| 5,699,130 A | 12/1997 | Taylor | |
| 5,757,348 A | 5/1998 | Handschy et al. | |
| 5,796,442 A | 8/1998 | Gove et al. | |
| 5,809,182 A | 9/1998 | Ward et al. | |
| 5,844,663 A | 12/1998 | Holley et al. | |
| 5,865,520 A | 2/1999 | Kavanagh et al. | |
| 5,902,030 A | 5/1999 | Blanchard | |
| 5,933,588 A * | 8/1999 | Easwar et al. | 358/1.17 |
| 5,956,000 A | 9/1999 | Kreitman et al. | |
| 5,978,142 A * | 11/1999 | Blackham et al. | 359/618 |
| 5,986,640 A | 11/1999 | Baldwin et al. | |
| 5,990,982 A | 11/1999 | Gove et al. | |
| 6,017,123 A | 1/2000 | Bleha et al. | |
| 6,034,660 A | 3/2000 | Millward et al. | |
| 6,057,816 A | 5/2000 | Eckersley | |
| 6,064,366 A | 5/2000 | Millward et al. | |
| 6,215,547 B1 * | 4/2001 | Ramanujan et al. | 355/67 |
| 6,224,217 B1 | 5/2001 | Tanaka | |
| 6,276,801 B1 | 8/2001 | Fielding | |
| 6,285,349 B1 | 9/2001 | Smith | |
| 6,317,112 B1 | 11/2001 | Handschy et al. | |
| 6,348,907 B1 | 2/2002 | Wood | |
| 6,373,603 B1 | 4/2002 | Popovich et al. | |
| 6,456,301 B1 * | 9/2002 | Huang | 345/691 |
| 6,795,221 B1 | 9/2004 | Urey | |
| 2003/0063226 A1 | 4/2003 | Gibbon et al. | |
| 2004/0001184 A1 | 1/2004 | Gibbon et al. | |

FOREIGN PATENT DOCUMENTS

| | | |
|---|---|---|
| EP | 0 139 991 A2 | 5/1985 |
| EP | 0 606 162 A2 | 7/1994 |
| EP | 0 751 683 | 1/1997 |
| EP | 0 786 687 | 7/1997 |
| EP | 0 961 502 A2 | 12/1999 |
| EP | 0 755 556 | 5/2000 |
| JP | H6-102484 | 4/1994 |
| WO | WO 94/10675 | 5/1994 |
| WO | WO 95/25292 | 9/1995 |
| WO | WO 96/04582 | 2/1996 |
| WO | WO 99/60557 | 11/1999 |
| WO | WO 01/41455 A1 | 6/2001 |
| WO | WO 01/96907 A2 | 12/2001 |
| WO | WO 01/96907 A3 | 12/2001 |
| WO | WO 02/03687 A2 | 1/2002 |
| WO | WO 02/03687 A3 | 1/2002 |

OTHER PUBLICATIONS

Patent Abstracts of Japan, vol. 1999, No. 03, Mar. 31, 1999 & JP 10 319500 A (Fujitsu General Ltd.), Dec. 4, 1998.

Chen, et al., 'Fundamentals of Scalable High Resolution Seamlessly Tiled Projection System,' *Proc. SPIE*, 4294:67-74 (2001).

Bleha, "Image Light Amplifier (ILA) Technology for Large-Screen Projection," SMPTE Journal, 710-717 (Oct. 1997).

Paper authored by Larry J. Hornbeck, Texas Instruments, Digital Operations, Dallas, Texas 'Digital Light Processing™ for High-Brightness, High-Resolution Applications,' *Electronic Imaging*, EI, Project Displays III, Co-Sponsored by IS&T and SPIE, An Invited Paper, Feb. 10-12, 1997, San Jose, California USA, pp. 1-14.

* cited by examiner

| Single DMD | | | | | | | | DMD1 | | | | | DMD2 | | | | | Serial DMD | | |
|---|---|---|---|---|---|---|---|---|---|---|---|---|---|---|---|---|---|---|---|---|
| b5 | b4 | b3 | b2 | b1 | b0 | value | PWM(Y) | b3 | b2 | b1 | b0 | Y1 | b3 | b2 | b1 | b0 | Y2 | Y1*Y2 | New Code | Error |
| 0 | 0 | 0 | 0 | 0 | 0 | 0 | 0 | 0 | 1 | 0 | 0 | 0.26667 | 0 | 0 | 0 | 0 | 0 | 0 | 0 | 0 |
| 0 | 0 | 0 | 0 | 0 | 1 | 1 | 0.01587 | 0 | 1 | 0 | 0 | 0.26667 | 0 | 0 | 0 | 1 | 0.06667 | 0.017778 | 1 | 0.001905 |
| 0 | 0 | 0 | 0 | 1 | 0 | 2 | 0.03175 | 0 | 1 | 0 | 0 | 0.26667 | 0 | 0 | 1 | 0 | 0.13333 | 0.035556 | 2 | 0.00381 |
| 0 | 0 | 0 | 0 | 1 | 1 | 3 | 0.04762 | 0 | 1 | 0 | 0 | 0.26667 | 0 | 0 | 1 | 1 | 0.2 | 0.053333 | 3 | 0.005714 |
| 0 | 0 | 0 | 1 | 0 | 0 | 4 | 0.06349 | 0 | 1 | 0 | 0 | 0.26667 | 0 | 1 | 0 | 0 | 0.26667 | 0.071111 | 4 | 0.007619 |
| 0 | 0 | 0 | 1 | 0 | 1 | 5 | 0.07937 | 0 | 1 | 0 | 0 | 0.26667 | 0 | 1 | 0 | 1 | 0.33333 | 0.088889 | 6 | -0.006349 |
| 0 | 0 | 0 | 1 | 1 | 0 | 6 | 0.09524 | 0 | 1 | 0 | 0 | 0.26667 | 0 | 1 | 1 | 0 | 0.4 | 0.106667 | 7 | -0.004444 |
| 0 | 0 | 0 | 1 | 1 | 1 | 7 | 0.11111 | 0 | 1 | 0 | 0 | 0.26667 | 0 | 1 | 1 | 1 | 0.46667 | 0.124444 | 8 | -0.00254 |
| 0 | 0 | 1 | 0 | 0 | 0 | 8 | 0.12698 | 0 | 1 | 0 | 0 | 0.26667 | 1 | 0 | 0 | 0 | 0.53333 | 0.142222 | 9 | -0.000635 |
| 0 | 0 | 1 | 0 | 0 | 1 | 9 | 0.14286 | 0 | 1 | 0 | 0 | 0.26667 | 1 | 0 | 0 | 1 | 0.6 | 0.16 | 10 | 0.00127 |
| 0 | 0 | 1 | 0 | 1 | 0 | 10 | 0.15873 | 0 | 1 | 0 | 0 | 0.26667 | 1 | 0 | 1 | 0 | 0.66667 | 0.177778 | 11 | 0.003175 |
| 0 | 0 | 1 | 0 | 1 | 1 | 11 | 0.1746 | 0 | 1 | 0 | 0 | 0.26667 | 1 | 0 | 1 | 1 | 0.73333 | 0.195556 | 12 | 0.005079 |
| 0 | 0 | 1 | 1 | 0 | 0 | 12 | 0.19048 | 0 | 1 | 0 | 0 | 0.26667 | 1 | 1 | 0 | 0 | 0.8 | 0.213333 | 13 | 0.006984 |
| 0 | 0 | 1 | 1 | 0 | 1 | 13 | 0.20635 | 0 | 1 | 0 | 0 | 0.26667 | 1 | 1 | 0 | 1 | 0.86667 | 0.231111 | 15 | -0.006984 |
| 0 | 0 | 1 | 1 | 1 | 0 | 14 | 0.22222 | 0 | 1 | 0 | 0 | 0.26667 | 1 | 1 | 1 | 0 | 0.93333 | 0.248889 | 16 | -0.005079 |
| 0 | 0 | 1 | 1 | 1 | 1 | 15 | 0.2381 | 0 | 1 | 0 | 0 | 0.26667 | 1 | 1 | 1 | 1 | 1 | 0.266667 | 17 | -0.003175 |
| 0 | 1 | 0 | 0 | 0 | 0 | 16 | 0.25397 | 1 | 0 | 0 | 0 | | 0 | 0 | 0 | 0 | | | | |
| 0 | 1 | 0 | 0 | 0 | 1 | 17 | 0.26984 | 1 | 0 | 0 | 0 | | 0 | 0 | 0 | 1 | | | | |
| 0 | 1 | 0 | 0 | 1 | 0 | 18 | 0.28571 | 1 | 0 | 0 | 0 | | 0 | 0 | 1 | 0 | | | | |
| 0 | 1 | 0 | 0 | 1 | 1 | 19 | 0.30159 | 1 | 0 | 0 | 0 | | 0 | 0 | 1 | 1 | | | | |
| 0 | 1 | 0 | 1 | 0 | 0 | 20 | 0.31746 | 1 | 0 | 0 | 0 | | 0 | 1 | 0 | 0 | | | | |
| 0 | 1 | 0 | 1 | 0 | 1 | 21 | 0.33333 | 1 | 0 | 0 | 0 | | 0 | 1 | 0 | 1 | | | | |
| 0 | 1 | 0 | 1 | 1 | 0 | 22 | 0.34921 | 1 | 0 | 0 | 0 | | 0 | 1 | 1 | 0 | | | | |
| 0 | 1 | 0 | 1 | 1 | 1 | 23 | 0.36508 | 1 | 0 | 0 | 0 | | 0 | 1 | 1 | 1 | | | | |
| 0 | 1 | 1 | 0 | 0 | 0 | 24 | 0.38095 | 1 | 0 | 0 | 0 | 0.53333 | 1 | 0 | 0 | 0 | 0.53333 | 0.284444 | 18 | -0.00127 |
| 0 | 1 | 1 | 0 | 0 | 1 | 25 | 0.39683 | 1 | 0 | 0 | 0 | 0.53333 | 1 | 0 | 0 | 1 | 0.6 | 0.32 | 20 | 0.00254 |
| 0 | 1 | 1 | 0 | 1 | 0 | 26 | 0.4127 | 1 | 0 | 0 | 0 | 0.53333 | 1 | 0 | 1 | 0 | 0.66667 | 0.355556 | 22 | 0.006349 |
| 0 | 1 | 1 | 0 | 1 | 1 | 27 | 0.42857 | 1 | 0 | 0 | 0 | 0.53333 | 1 | 0 | 1 | 1 | 0.73333 | 0.391111 | 25 | -0.005714 |
| 0 | 1 | 1 | 1 | 0 | 0 | 28 | 0.44444 | 1 | 0 | 0 | 0 | 0.53333 | 1 | 1 | 0 | 0 | 0.8 | 0.426667 | 27 | -0.001905 |
| 0 | 1 | 1 | 1 | 0 | 1 | 29 | 0.46032 | 1 | 0 | 0 | 0 | 0.53333 | 1 | 1 | 0 | 1 | 0.86667 | 0.462222 | 29 | 0.001905 |
| 0 | 1 | 1 | 1 | 1 | 0 | 30 | 0.47619 | 1 | 0 | 0 | 0 | 0.53333 | 1 | 1 | 1 | 0 | 0.93333 | 0.497778 | 31 | 0.005714 |
| 0 | 1 | 1 | 1 | 1 | 1 | 31 | 0.49206 | 1 | 0 | 0 | 0 | 0.53333 | 1 | 1 | 1 | 1 | 1 | 0.533333 | 34 | -0.006349 |
| 1 | 0 | 0 | 0 | 0 | 0 | 32 | 0.50794 | 1 | 1 | 0 | 0 | | 0 | 0 | 0 | 0 | | | | |
| 1 | 0 | 0 | 0 | 0 | 1 | 33 | 0.52381 | 1 | 1 | 0 | 0 | | 0 | 0 | 0 | 1 | | | | |
| 1 | 0 | 0 | 0 | 1 | 0 | 34 | 0.53968 | 1 | 1 | 0 | 0 | | 0 | 0 | 1 | 0 | | | | |
| 1 | 0 | 0 | 0 | 1 | 1 | 35 | 0.55556 | 1 | 1 | 0 | 0 | | 0 | 0 | 1 | 1 | | | | |
| 1 | 0 | 0 | 1 | 0 | 0 | 36 | 0.57143 | 1 | 1 | 0 | 0 | | 0 | 1 | 0 | 0 | | | | |
| 1 | 0 | 0 | 1 | 0 | 1 | 37 | 0.5873 | 1 | 1 | 0 | 0 | | 0 | 1 | 0 | 1 | | | | |
| 1 | 0 | 0 | 1 | 1 | 0 | 38 | 0.60317 | 1 | 1 | 0 | 0 | | 0 | 1 | 1 | 0 | | | | |
| 1 | 0 | 0 | 1 | 1 | 1 | 39 | 0.61905 | 1 | 1 | 0 | 0 | | 0 | 1 | 1 | 1 | | | | |
| 1 | 0 | 1 | 0 | 0 | 0 | 40 | 0.63492 | 1 | 1 | 0 | 0 | | 1 | 0 | 0 | 0 | | | | |
| 1 | 0 | 1 | 0 | 0 | 1 | 41 | 0.65079 | 1 | 1 | 0 | 0 | | 1 | 0 | 0 | 1 | | | | |
| 1 | 0 | 1 | 0 | 1 | 0 | 42 | 0.66667 | 1 | 1 | 0 | 0 | | 1 | 0 | 1 | 0 | | | | |
| 1 | 0 | 1 | 0 | 1 | 1 | 43 | 0.68254 | 1 | 1 | 0 | 0 | 0.8 | 1 | 0 | 1 | 1 | 0.73333 | 0.586667 | 37 | -0.000635 |
| 1 | 0 | 1 | 1 | 0 | 0 | 44 | 0.69841 | 1 | 1 | 0 | 0 | 0.8 | 1 | 1 | 0 | 0 | 0.8 | 0.64 | 40 | 0.005079 |
| 1 | 0 | 1 | 1 | 0 | 1 | 45 | 0.71429 | 1 | 1 | 0 | 0 | 0.8 | 1 | 1 | 0 | 1 | 0.86667 | 0.693333 | 44 | -0.005079 |
| 1 | 0 | 1 | 1 | 1 | 0 | 46 | 0.73016 | 1 | 1 | 0 | 0 | 0.8 | 1 | 1 | 1 | 0 | 0.93333 | 0.746667 | 47 | 0.000635 |
| 1 | 0 | 1 | 1 | 1 | 1 | 47 | 0.74603 | 1 | 1 | 0 | 0 | 0.8 | 1 | 1 | 1 | 1 | 1 | 0.8 | 50 | 0.006349 |
| 1 | 1 | 0 | 0 | 0 | 0 | 48 | 0.7619 | 1 | 1 | 1 | 1 | | 0 | 0 | 0 | 0 | | | | |
| 1 | 1 | 0 | 0 | 0 | 1 | 49 | 0.77778 | 1 | 1 | 1 | 1 | | 0 | 0 | 0 | 1 | | | | |
| 1 | 1 | 0 | 0 | 1 | 0 | 50 | 0.79365 | 1 | 1 | 1 | 1 | | 0 | 0 | 1 | 0 | | | | |
| 1 | 1 | 0 | 0 | 1 | 1 | 51 | 0.80952 | 1 | 1 | 1 | 1 | | 0 | 0 | 1 | 1 | | | | |
| 1 | 1 | 0 | 1 | 0 | 0 | 52 | 0.8254 | 1 | 1 | 1 | 1 | | 0 | 1 | 0 | 0 | | | | |
| 1 | 1 | 0 | 1 | 0 | 1 | 53 | 0.84127 | 1 | 1 | 1 | 1 | | 0 | 1 | 0 | 1 | | | | |
| 1 | 1 | 0 | 1 | 1 | 0 | 54 | 0.85714 | 1 | 1 | 1 | 1 | | 0 | 1 | 1 | 0 | | | | |
| 1 | 1 | 0 | 1 | 1 | 1 | 55 | 0.87302 | 1 | 1 | 1 | 1 | | 0 | 1 | 1 | 1 | | | | |
| 1 | 1 | 1 | 0 | 0 | 0 | 56 | 0.88889 | 1 | 1 | 1 | 1 | | 1 | 0 | 0 | 0 | | | | |
| 1 | 1 | 1 | 0 | 0 | 1 | 57 | 0.90476 | 1 | 1 | 1 | 1 | | 1 | 0 | 0 | 1 | | | | |
| 1 | 1 | 1 | 0 | 1 | 0 | 58 | 0.92063 | 1 | 1 | 1 | 1 | | 1 | 0 | 1 | 0 | | | | |
| 1 | 1 | 1 | 0 | 1 | 1 | 59 | 0.93651 | 1 | 1 | 1 | 1 | | 1 | 0 | 1 | 1 | | | | |
| 1 | 1 | 1 | 1 | 0 | 0 | 60 | 0.95238 | 1 | 1 | 1 | 1 | | 1 | 1 | 0 | 0 | | | | |
| 1 | 1 | 1 | 1 | 0 | 1 | 61 | 0.96825 | 1 | 1 | 1 | 1 | 1 | 1 | 1 | 0 | 1 | 0.86667 | 0.866667 | 55 | -0.006349 |
| 1 | 1 | 1 | 1 | 1 | 0 | 62 | 0.98413 | 1 | 1 | 1 | 1 | 1 | 1 | 1 | 1 | 0 | 0.93333 | 0.933333 | 59 | -0.003175 |
| 1 | 1 | 1 | 1 | 1 | 1 | 63 | 1 | 1 | 1 | 1 | 1 | 1 | 1 | 1 | 1 | 1 | 1 | 1 | 63 | 0 |

Figure 4

DMD-BASED IMAGE DISPLAY SYSTEMS

CROSS-REFERENCE TO RELATED APPLICATIONS

This application claims priority to U.S. Provisional Application No. 60/189,480 filed on Mar. 15, 2000 and International Application No. PCT/CA01/00339 filed on Mar. 15, 2001 and published in English as International Publication No. WO 01/69941 A2 on Sep. 20, 2001.

FIELD OF THE INVENTION

This invention relates to image display systems that employ so-called reflective spatial light modulators (SLMs) such as those in the form of digital micro-mirror devices (DMDs). In particular it relates to techniques for using multiple SLM devices arranged serially.

BACKGROUND OF THE INVENTION

U.S. Pat. No. 5,612,753 to Poradish, et al., discusses a system where the images of two SLMs are projected onto a screen. The two images are the same size and are fully overlapped. In this arrangement there is a one to one correspondence between the pixels of each SLM. The Poradish patent makes reference primarily to the use of this parallel SLM technique for the improvement in light output and mitigation of color artifacts produced by the use of a field sequential color system that usually employs a color filter wheel and a single SLM.

Poradish does mention the use of parallel SLM devices for the mitigation of gray level contouring artifacts or increasing the dynamic range of the display, but the patent does not teach a method by which this may be accomplished.

When SLM based projection systems are to be used for a cinematic presentation, it is desirable for the image quality of the system to approach that of the film based projection systems commonly in use. This requires that the system has a high spatial resolution and that the system possesses a wide dynamic range. While film based systems easily produce contrast ranges of 1000:1 or greater, SLM based systems such as those based on DMDs are typically limited to contrast ranges of 500:1 or less.

In particular SLM devices have a finite black level. That is, the minimum displayed intensity in the off state for any SLM is greater than zero. In circumstances found in motion picture theatres this minimum black level is often found to be too high and the "gray" image visible when the picture is "black" is distracting and serves to emphasize that the system is different from a film based projection system.

SLM devices consist of a number of separately addressable picture elements or pixels in a x-y array. Different types of SLMs employ different methods for achieving a gray scale intensity control for each pixel. Some devices employ a continuously varying analog signal (such as reflective liquid crystal devices) while DMD devices employ pulse width modulation of pixel sized mirrors that switch between only two states, "on" and "off".

A DMD is essentially an array of microscopic-sized mirrors on a computer chip. A post that allows the mirror to tilt supports each mirror. The chip includes electronic circuitry for moving each mirror between on and off positions using an electrostatic field. When the DMD mirror is in the on position light is reflected from the DMD onto a screen or other image plane. When the DMD is off the light is reflected to a "light dump" and does not reach the screen or image plane.

The mirrors are individually addressable so that which mirror is on and which is off at any given time determines the image. A memory cell associated with each mirror stores a bit of data that determines the on or off state of the address signal. Each mirror is addressed with a signal that indicates whether or not the mirror is to be on or off and therefore whether or not light is to be reflected to the image plane or screen.

A grayscale is obtained through a technique called binary pulse width modulation (PWM).

Under PWM, a frame interval T is divided into n time durations of $$\frac{1}{2^n-1}, \frac{2}{2^n-1}, \ldots, \frac{2^{n-1}}{2^n-1},$$

each represents a bit in a n-bit binary word $x=\{b_n b_{n-1} b_{n-2} \ldots b_1\}$. As a result, the value of binary word x is represented by y, the time duration when the mirror is on, and y can be calculated by:

$$T_x = yT = T \sum_{i=1}^{n} \frac{b_i 2^{i-1}}{2^n-1}$$

The shortest time duration $$\frac{T}{2^n-1}$$

represents the least significant bit (LSB) of the binary word, and it is called the LSB time, expressed as:

$$T_{LSB} = \frac{T}{2^n-1}.$$

The LSB time is mainly limited by the mechanical switching time of a DMD chip. Typically, the LSB time is about 20 μsec. Therefore, the bit-depth, or the number of bits in a binary word representing the intensity of each pixel in the image formed by the DMD, is limited by both the LSB time and the frame rate. For a frame rate of 24 fps, the maximum bit-depth that a DMD can support is n=11.

Each single micro mirror on a DMD chip is a reflective device, and the total amount of output light for a binary word x is proportional to the "on-time" $T_x$ if the optical switching time can be ignored. In fact, the optical switching time of a DMD is around 2 μs, which is about one-tenth of the LSB time, and can be neglected in the following analysis. If the input binary word x is simply encoded to be linear to scene brightness, then a DMD chip can be considered a linear device with respect to brightness.

A simplified cross section of a single DMD mirror array is shown in FIG. 1. Assume the incident light from a light source is L The light from this source falls on the mirror array, and when a mirror is in the on state the light is reflected by the mirror with an optical pixel efficiency of α<1. The output pixel brightness P can be calculated by:

$$P = (\alpha y + \delta)L = \alpha yL + L_{dark}$$

The second item $L_{dark} = \delta L$ represents the "dark level" of a DMD. This corresponds to the light reflected by a pixel of the array when the associated mirror is in the off state. This dark level is the combined result of light diffraction from mirror edges, reflection from the underlying substrate and scattering from the mirror surface, particularly around the dimple formed at the support post location. This combined effect is modeled by a factor $\delta$ and is typically:

$$\delta \ll \frac{1}{2^n - 1}$$

The "dark level" determines the contrast ratio of a DMD device. It can be reduced by architectural improvement to the DMD pixels, but it may not be completed eliminated.

The simplest implementation of a PWM scheme makes the period of the most significant bit ½ of the total frame time. The period of the next most significant bit is ½ of this or ¼ of the total and so on.

At certain bit transitions, such as for example in an 8 bit system where the msb switches off, and the remaining bits switch on, that is the displayed code value switches from 1000000 binary to 01111111 binary, the temporal position of the associated light reflected by a pixel making this code transition changes from the first half of the frame interval to the second half. As a result temporal artifacts are produced that are found to be problematic when displaying moving images.

These artifacts can be reduced by avoiding such transitions, and by spreading the time that a bit is on during the frame more uniformly throughout the frame duration. This is obtained for example by dividing the most significant bit into say 4 separate parts, making four equal on-off transitions for the bit during the frame time, yielding the same intensity, but splitting the on time into four parts equally spaced throughout the frame duration. Additional complexity may be introduced to further smooth the transitions that occur during a gray scale ramp and to avoid the creation of low frequencies that are more noticeable as flicker in the image.

Where full-color images are required, three DMDs may be used, one for each primary color (RGB). The light from the DMDs converges so that the viewer perceives color. Another technique is to use a single DMD and a so-called "color wheel" having sections in the primary colors so that light incident on the DMD is sequentially colored RGB. The viewer's eye then integrates the sequential images into a continuous color image.

Other types of SLMs may be similarly arranged to obtain color images.

SUMMARY OF THE INVENTION

The performance of currently available SLMs is not sufficient for creating a visual sensation equivalent to a film-based system. There are three issues: dynamic range, contrast ratio and frame rate.

The present invention is directed towards a projection system comprising a controller, a first reflective SLM and a second reflective SLM. The first reflective SLM is operatively coupled to the controller to receive first image data from the controller and is aligned to receive light from a light source and to reflect imaging light correlated to the first image The second reflective SLM is operatively coupled to the controller to receive second image data from the controller and is aligned to receive imaging light from the first reflective SLM and to reflect modified imaging light. Typically, the projection system will also include a light source and optical components such as a projection lens.

The invention is also directed towards a projection system comprising a controller and a plurality of reflective SLMs operatively coupled to the controller to receive image data from the controller. The reflective SLMs are aligned in series to receive light from a light source and to reflect imaging light correlated to the image data.

BRIEF DESCRIPTION OF THE DRAWINGS

The present invention will now be described, by way of example only, with reference to the following drawings, in which like reference numerals refer to like parts and in which:

FIG. 4 is a chart which shows a codebook for setting the pixel values of a serial DMD having two four-bit DMD arrays, made in accordance with the present invention and correlating the brightness levels achieved by the serial DMD with those of a six-bit DMD;

DESCRIPTION OF THE PREFERRED EMBODIMENTS

Figure 1:
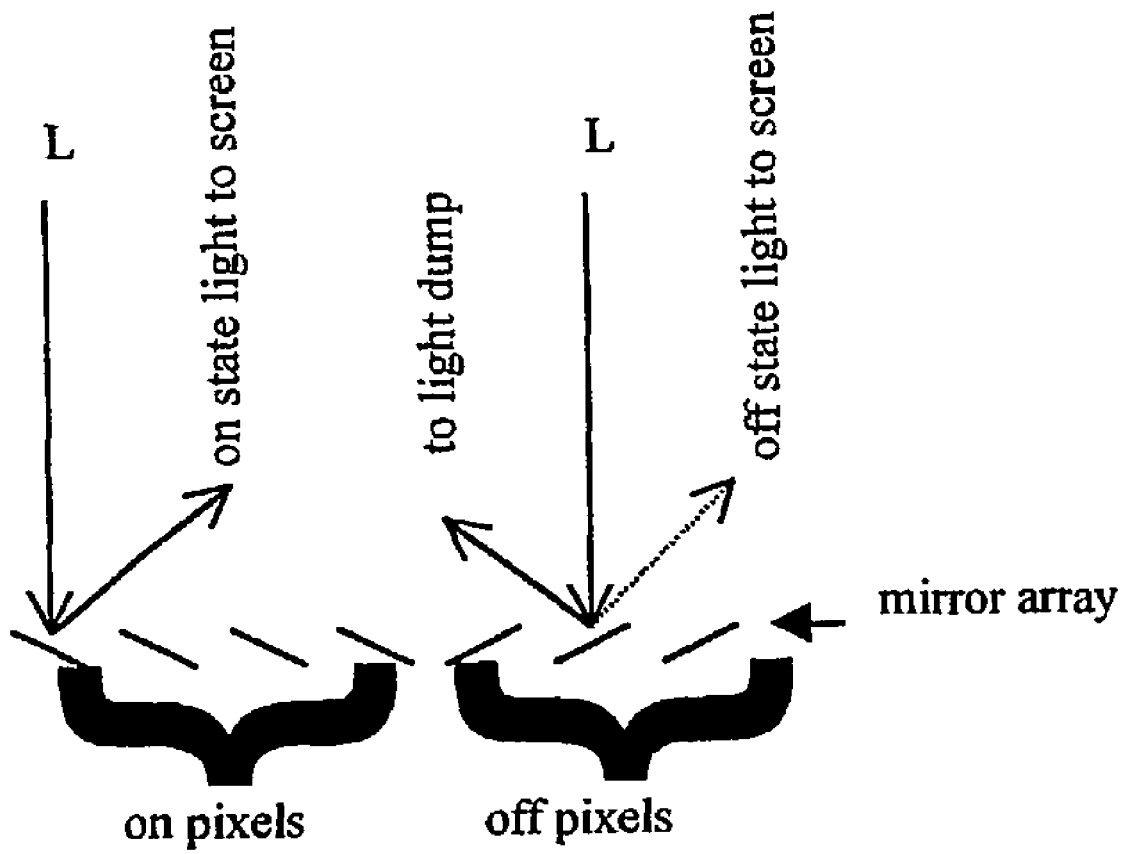
FIG. 1 is a schematic diagram of a row of micro mirrors on a DMD illustrating the transmission of light by micro mirrors in the "on" and "off" positions.

For SLMs such as DMDs where mechanical switching is used, the maximum number of bits possible with a binary PWM scheme is determined by the period of the LSB. For current DMD devices the minimum period of the LSB is equal to the mechanical switching time of the mirrors, which is about 20 μsec. For a frame rate of 24 fps, the period of the LSB means that a total of 11 bits can be represented in the 41.67 msec. available for each frame. The number of possible bits determines the total number of steps available to represent a grayscale image, and this corresponds to the dynamic range of the resulting image.

It should also be clear that increasing the frame rate reduces the time available for the creation of various bit durations using binary PWM, and as a result the number of bits available is reduced, as is the corresponding dynamic range.

The contrast ratio of a system is limited by the maximum difference between the dark level of the SLM and the maximum light level that the SLM can deliver that corresponds to a full white input signal level.

The available bit depth of 11 bits, or a dynamic range of 2048 steps, is inferior to a film-based system which can reach an equivalent bit-depth of nearly 14 (16,383 steps) in shadow areas. The current DMD contrast ratio is about 500:1, which is lower than the 1000:1 ratio required by film-based system. Finally, for certain applications, such as 48 fps Imax HD projection system or Imax 3D system using LCD alternating shutter glasses, there is a need to increase the frame rate of a projection system. In the case of the DMD, any increase in frame rate will further reduce effective bit-depth.

By placing two reflective SLMs in series the limitations of a single DMD can be overcome through the multiplicative effect of the two SLMs when displaying a grayscale. This can be better understood with reference to the projection system shown generally as 2 in FIG. 2.

As illustrated by light ray vector 4 shown in dotted line, light source and reflector 10 illuminate integrator rod 12 via cold mirror 11. Relay 14 directs the light 4 from 12 onto the surface of a first DMD device 16 at a suitable angle so that the on state light is directed through relay 18 which images the light from 16 onto the surface of a second DMD device 20 so that there is a one to one correspondence between the pixels of 16 and 20. On state light from the second DMD 20 then passes onto the projection lens (not shown) or other imaging system and then to the projection screen.

As will be understood, the system 2, also includes a controller 22, operatively coupled to the first and second DMDs 16, 20. The controller 22 is suitably programmed to provide image data to the DMDs 16, 20. As discussed in greater detail below, the image data comprises pulse width modulation data corresponding to each micro mirror in the array of each DMD 16, 20.

The system 2 may optionally include a color wheel 9 (shown in dotted outline) operatively coupled to the controller 22 for color display. In such a configuration, the image data generated by the controller 22 will include pulse width modulation signals correlated to and synchronized with each color on the color wheel (typically, red, green and blue).

As will be understood by one skilled in the art, if the optical configuration of the system 2 results in an inverted or reverse image, the image data provided by the controller 22 to the first DMD 16, will correspondingly be reversed or inverted.

While the system 2 has been shown as incorporating two DMDs 16, 20 in series, it should be understood that the system 2 may include more than two DMDs in series, providing additional improvements in contrast levels in the projected images. Typically the loss of light as a result of optical transmission inefficiencies limit the number of DMDs which may be aligned in series and produce acceptable results.

Figure 3:
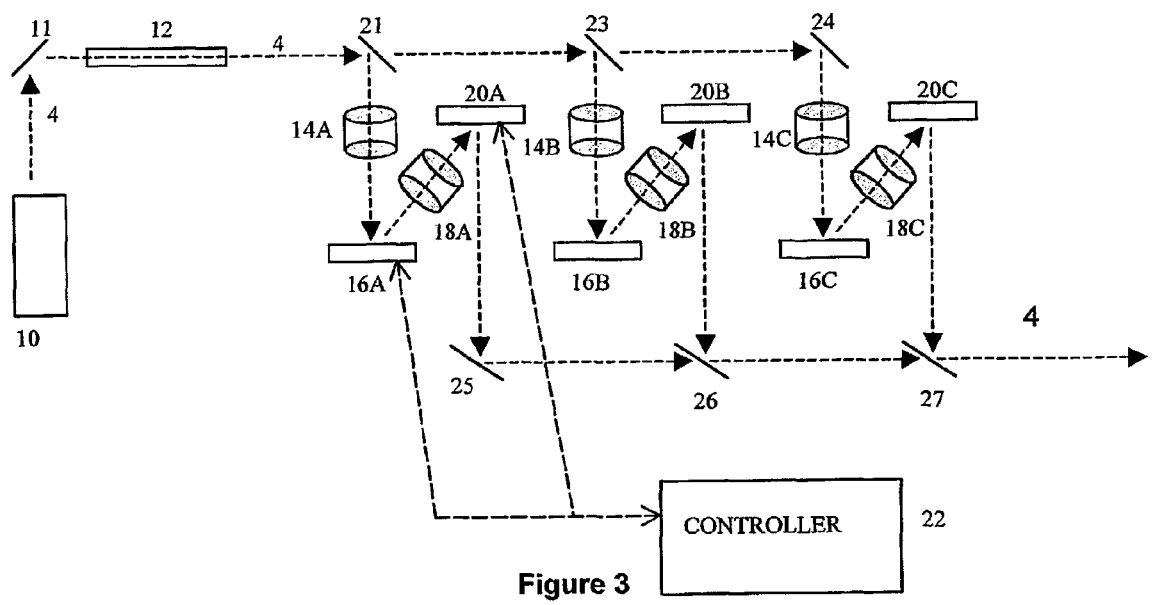
FIG. 3 is a schematic diagram of the components of a serial color DMD image display system made in accordance with the subject invention.

A color version of the serial SLM system of the present invention may be understood with reference to the color projection system shown generally as 3 in FIG. 3.

As illustrated by light ray vector 4 shown in dotted line, white light source and reflector 10 illuminate integrator rod 12 via cold mirror 11. By using mirrors 21 and 23, which are dichroic mirrors that selectively reflect some wavelengths of light and transmit others, the white light from the source 10 is divided into three wavelength bands, corresponding to the red, green and blue portions of the spectrum. Wavelength selectively reflecting mirror 21 reflects the red portion of the light from the integrator rod 12 towards relay 14A and allows the green and blue portion of the light to pass on towards mirrors 23 and 24.

Relay 14A directs the red light from mirror 21 onto the surface of a first DMD device 16A at a suitable angle so that the on state light is directed through relay 18A which images the light from 16A onto the surface of a second DMD device 20A so that there is a one to one correspondence between the pixels of 16A and 20A. On state light from the second DMD 20A then reaches plain mirror 25 and is reflected towards wavelength selective mirrors 26 and 27 which pass the red light onto the projection lens (not shown) or other imaging system and then to the projection screen.

In a similar manner, wavelength selectively reflecting mirror 23 directs the green portion of the light towards relay 14B and the components following while allowing the blue portion of the light to continue on towards mirror 24. Plain mirror 24 directs the blue light that remains towards relay 14C and the components following.

The output of the second serial DMD system consisting of components 14B-20B is directed towards the projection lens by wavelength selective mirror 26 which passes the red light from mirror 24 and reflects the green light from 20B towards the projection lens. In a similar fashion, the output of the third serial DMD system 14C-20C is directed towards the projection lens by wavelength selective mirror 27 which passes the red light from mirror 24 and green light from mirror 25 while reflecting the blue light from 20C towards the projection lens.

It should also be clear that other systems of dividing the input light into color bands and combining the output of the serial DMD systems may be used without departing from the spirit of the invention. It should also be understood that three colored light sources with reflectors, cold mirrors and integrating rods could be used to separately illuminate the three serial DMD systems. It should also be understood that the system 3 is a schematic representation of a three color system, and those skilled in the art will recognize that additional optical elements may be required to allow combining the output of each color channel into a single projection lens or image plane.

As will be understood, the system 3 also includes a controller 22, operatively coupled to the three sets of first and second DMDs 16A-C and 20A-C. For clarity, FIG. 3 only shows the operative connection between the controller 22 and first DMD 16A and second DMD 20A, although it will be understood that similar connections exist between the controller 22 and the remaining DMDs 16B-C and 20B-C. The controller 22 is suitably programmed to provide image data to the DMDs 16A-C and 20A-C. As discussed in greater detail below, the image data comprises pulse width modulation data corresponding to each micro mirror in the array of each DMD 16A-C and 20A-C.

The operation of a serial DMD system may be further understood as follows. Assume that the optical efficiencies of the first and second DMDs are represented by $\alpha_1, \alpha_2$, the "dark level" factors by $\delta_1, \delta_2$, the output pixel brightness of the two serial DMDs can be described by (the serial DMD equation):

$$P_2 = (\alpha_2 y_2 + \delta_2) P_1$$
$$= (\alpha_2 y_2 + \delta_2)(\alpha_1 y_1 + \delta_1) L$$
$$= (\alpha_1 \alpha_2 y_1 y_2 + \alpha_1 \delta_2 y_1 + \alpha_2 \delta_1 y_2 + \delta_1 \delta_2) L$$
$$= \alpha_s y_1 y_2 L + \varepsilon_s L + \delta_s L$$

Where $P_1$ is the output brightness of the first DMD 16 and $\alpha_1$, $\delta_1$ and $y_1$ are the optical efficiency, dark level factor and bit duration of the first DMD 16 respectively. Similarly $P_2$, $\alpha_2$, $\delta_2$ and $y_2$ are the optical efficiency, dark level factor and bit duration of the second DMD 20.

Compare the serial DMD equation with the single DMD equation shown previously in the background section. Here the two serial DMDs have a total optical efficiency of $\alpha_s = \alpha_1 \alpha_2$ and a dark level factor of $\delta_s = \delta_1 \delta_2$. Since the optical efficiency of a single DMD is about 60% with current technology, the combined optical efficiency will be reduced to $\alpha_s \cup 0.36$. However, the combined dark level factor $\delta_s$ will also be much lower than that of a single DMD. The second item $\epsilon_s L = \alpha_1 \delta_2 y_1 + \alpha_2 \delta_1 y_2$ in the serial DMD equation represents the cross talk between two DMDs and should be considered signal dependent noise. When n is large, both $\delta_1$, and $\delta_2$ should be small compared to the signals in the serial DMD equation and can be ignored.

If we ignore the cross talk item $\epsilon_s$ then the output brightness from two serial DMDs can be considered linear to the product of bit time durations $y_1 y_2$. In order for the two PWM sequences of the serial DMDs to function in this manner the following requirements must be met:
1. The PWM sequences of the two serial DMDs must be synchronized.
2. Each bit duration or split bit duration of the second DMD must correspond to the available durations of the bits for the first DMD, that is each bit sequence of the second DMD must be illuminated by any bit sequence of the first DMD in order to produce the multiplicative effect of bit time durations for all intensities.

In practice, requirement 2, above, typically limits the bit sequences of the first DMD to simple PWM schemes, while more complex bit splitting schemes may be employed with the second DMD.

In this embodiment one method for allocating the bits of a larger binary word between the two DMD devices is to allocate the top k most significant bits of each m-bit binary word to the first DMD and the balance to the second. This can be explained by a simple example.

Assume each DMD in a serial DMD configuration has 100% optical efficiency and supports n=4 bit depth. When the first DMD produces a brightness value that is exactly half of the total brightness range, the second DMD will represent the half brightness range with $2^n = 2^4 = 16$ brightness levels. The result is equivalent to a bit depth of m=5, effectively adding one bit to the bit-depth within the lower half of the brightness range. When the first DMD output increases to maximum brightness, the DMD will produce $2^4 = 16$ levels for the entire brightness range. However, since the lower half already has a representation of 16 levels, then only the top half needs additional 8 levels. The resulting coding will have total of 24 levels, with top half represented by 4 bit-depth and lower half by 5 bit-depth. Considering human brightness perception actually has a near logarithmic response, this coding scheme may actually be more efficient than the linear coding used in a conventional single DMD based system.

In general, if the first DMD maintains $2^k$ equally spaced brightness levels, a serial DMD device should have a dynamic range performance equivalent to k+n bit depth, at least within the lowest level. In practice, due to the binary pulse width modulation (PWM) scheme utilized, a frame duration is not divided into $2^n$ but $2^n - 1$ equal segments, which makes actual code design more complex. In this example we select $2^k$ levels for the first DMD, and run the second DMD at the full pixel depth available based on the frame rate.

Figure 5:
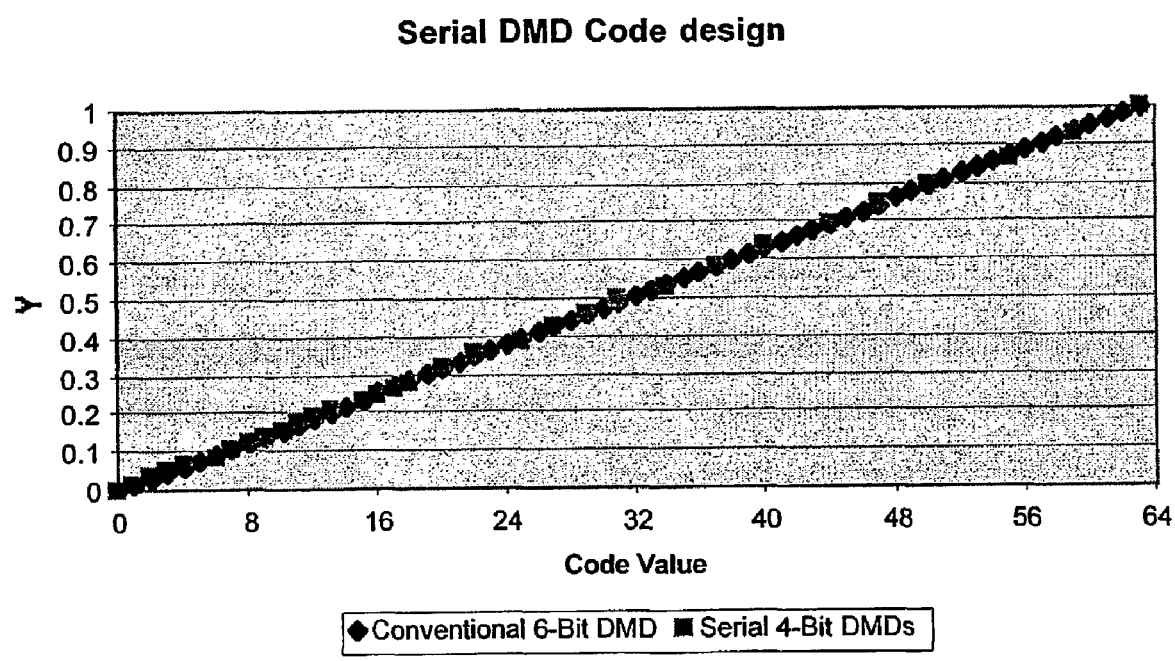
FIG. 5 is a graph of the distribution of the codes for the serial DMD indicated in FIG. 4, shown plotted against the six-bit DMD of FIG. 4.

The actual code value represented by each code word will be selected based on the following two criteria:
Each code word $x_1 x_2$ represents an equivalent code from a k+n linear codebook;
The equivalent code value is selected by minimization of the time duration error.
The table in FIG. 4 shows a codebook for a serial DMD design using two devices each producing a total of 16 steps or 4 bits per pixel bit depth. The first DMD outputs four approximately equally spaced brightness levels. New code words are selected based on error minimization. The resulting new codes have 32 code words with a performance equivalent to a bit-depth of 6 bits, as illustrated by the corresponding data on the chart. The distribution of the new codes is shown plotted against a true 6-bit linear code in FIG. 5. As will be understood, this code design method can be extended to actual DMD devices with arbitrary bit-depth. As will be understood, the codes listed on the chart in FIG. 4 are not exhaustive of the various binary combinations available. Accordingly, different combinations of pulse width modulation or intensity data may be determined, to provide alternative intensity levels.

While this invention has been described with reference to DMD devices, other reflective SLMs may be employed, particularly ones which do not rely on PWM techniques may be used for one or both SLMs, freeing the design from the code design restrictions and complexity imposed by the PWM scheme.

Figure 2:
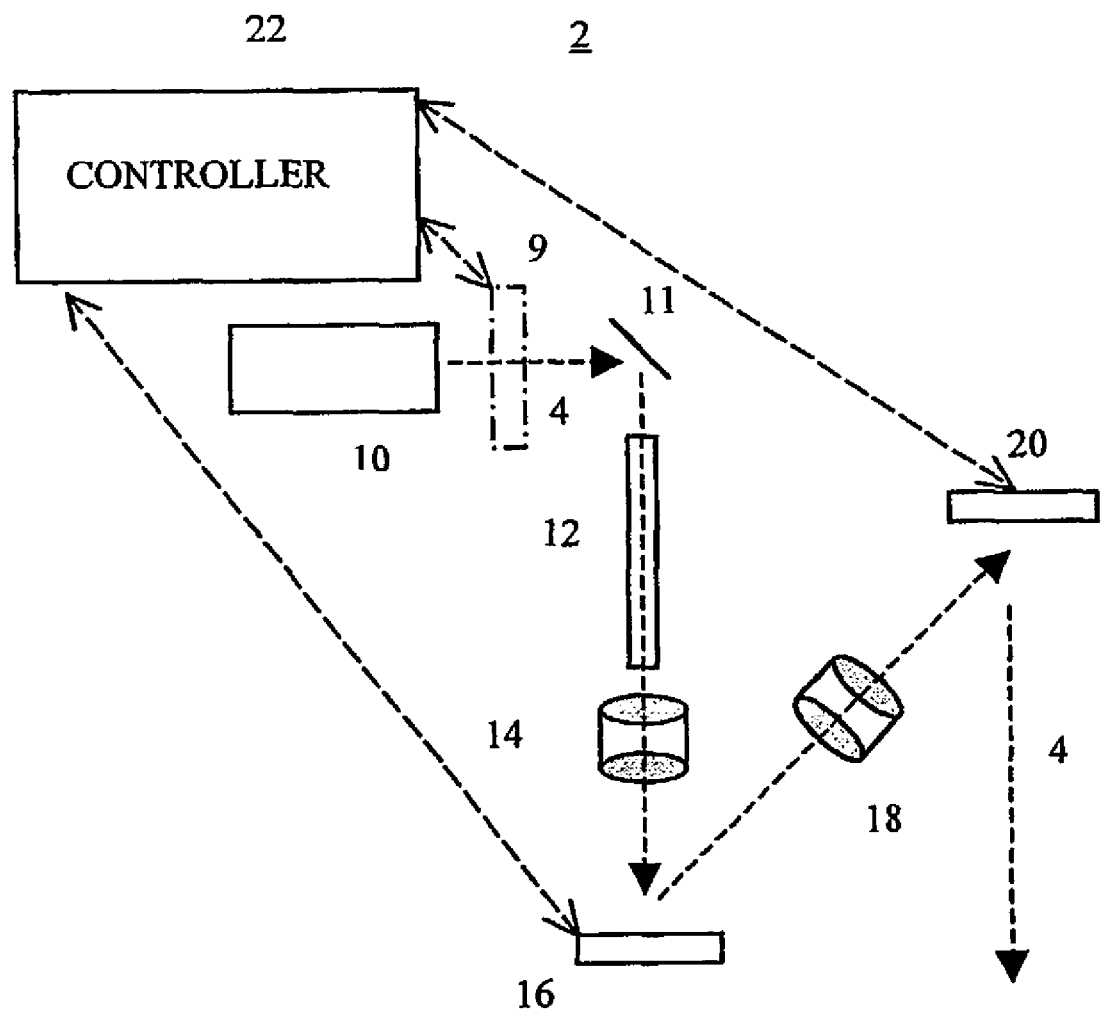
FIG. 2 is a schematic diagram of the components of a serial DMD image display system made in accordance with the subject invention.

It should also be clear to those skilled in the art that alternative arrangements of optical elements and SLMs other than those shown in FIG. 2 can be used to accomplish the pixel aligned serial arrangement of the two SLMs.

We claim:
1. A projection system comprising:
 (a) a first spatial light modulator (SLM) having a first array of separately addressable pixels, the first SLM adapted to receive light from a light source and to modulate light into a subsequent SLM;
 (b) a second SLM having a second array of separately addressable pixels, the second SLM positioned in series with the first SLM to receive modulated light from the first SLM and to direct that light for producing an output; and
 (c) a controller coupled to the first SLM for delivering first image data comprising first pulse width modulation data to the first SLM, and coupled to the second SLM, for delivering second image data comprising second pulse width modulation data to the second SLM, wherein the first pulse width modulation data is synchronized with the second pulse width modulation data and each bit duration and split bit duration of the second SLM corresponds to an available bit duration and split bit duration of the first SLM in order to produce a multiplicative effect of a bit time duration for all image intensities to provide a viewable image at said output.
2. The projection system as claimed in claim 1, wherein the first SLM is a digital micro mirror device and wherein the first array is an array of addressable micro mirrors and wherein the second SLM is a digital micro mirror device and wherein the second array is an array of addressable micro mirrors.
3. The projection system as claimed in claim 1 wherein the first SLM is a reflective liquid crystal device and the second SLM is a reflective liquid crystal device.
4. The projection system as claimed in claim 1 wherein each pixel in the second array corresponds to a pixel in the first array.
5. The projection system as claimed in claim 1 wherein the first image data comprises first intensity data for each pixel in the first array.
6. The projection system as claimed in claim 5, wherein the second image data comprises second intensity data for each pixel in the second array.

7. The projection system as claimed in claim 5, wherein the first intensity data comprises the first pulse width modulation data.

8. The projection system as claimed in claim 6, wherein the second intensity data comprises the second pulse width modulation data.

9. The projection system as claimed in claim 1, further comprising a color wheel operatively coupled to the controller for providing color to the viewable image.

10. The projection system as claimed in claim 1, further comprising a relay for aligning the light onto the second SLM.

11. The projection system as claimed in claim 1, further comprising a projection lens.

12. A projection system as claimed in claim 1, wherein a multiplicative product of a first output by the first SLM determined by the first image signal and a second output by a second SLM determined by the second image signal achieves a light output enhancement.

13. The projection system as claimed in claim 1 wherein the first SLM is a first type of reflective SLM device and the second SLM is a second type of reflective SLM device.

14. The projection system as claimed in claim 13 wherein the first SLM is a reflective liquid crystal device and the second SLM is a digital mirror device.

15. A projection system comprising:
(a) a first spatial light modulator (SLM) having a first array of separately addressable pixels, the first SLM adapted to receive light from a light source and to modulate light into a subsequent SLM;
(b) a second SLM having a second array of separately addressable pixels, the second SLM positioned in series with the first SLM to receive modulated light from the first SLM and to direct that light for producing an output; and
(c) a controller coupled to the first SLM, for delivering first image data comprising first pulse width modulation data to the first SLM, and coupled to the second SLM for delivering second image data comprising second pulse width modulation data to the second SLM, wherein the first pulse width modulation data is synchronized with the second pulse width modulation data and each bit duration and split bit duration of the second SLM corresponds to an available bit duration and split bit duration of the first SLM to provide a viewable image at said output, wherein the controller is capable of splitting image data of a higher bit-depth into at least the first image data and the second image data in accordance with a coding scheme, the first and second image data having a lower bit depth than the image data, and wherein the controller is capable of delivering the first image data to the first SLM and the second image data to the second SLM to produce an overall output dynamic range that exceeds a dynamic range limitation of each the first and second SLM.

16. The projection system as claimed in claim 15, wherein the controller limits the first image data to simple pulse width modulation schemes and uses more complex bit splitting schemes for the second image data.

17. The projection system as claimed in claim 15, wherein the coding scheme used by the controller splits higher bit-depth image data such that each higher bit-depth pixel code of the image data is represented by a lower bit-depth first codeword and a lower bit-depth second codeword, and a combined result from the first and second codewords is equivalent to a higher bit-depth pixel code.

18. The projection system as claimed in claim 17, wherein a first bit-depth of the first codeword matches a first dynamic range of the first SLM and a second bit-depth of the second codeword matches a second dynamic range of the second SLM.

19. The projection system as claimed in claim 17, wherein the higher bit-depth pixel code is selected based on error minimization.

20. The projection system as claimed in claim 17, wherein a result of the first codeword and the second codeword produces nonlinear brightness levels in accordance with human visual ability to detect variations in light intensity levels.

21. The projection system as claimed in claim 18, wherein a combination of first codewords of all pixels of the first image data form a first image for the first SLM and the combination of second codewords of all pixels of the second image data form a second image for the second SLM to form the viewable image.

22. The projection system as claimed in claim 21, wherein the first codeword for the first SLM produces approximately equally spaced brightness levels.

23. A method of increasing the contrast ratio of a projection system that comprises a first spatial light modulator (SLM), a second SLM, a light source, a controller, and a projection lens, wherein the first and second SLM each have array of addressable pixels, the meted comprising:
receiving image data;
splitting image data of a higher bit depth into at least first image data and second image data in accordance with a coding scheme, the first and second image data having a lower bit depth than the image data; and
delivering the first image data to the first SLM and the second image data to the second SLM to produce an overall output dynamic range that exceeds a dynamic range limitation of each the first and second SLM.

24. The method of claim 23, wherein the first image data comprises first pulse width modulation data and the second image data comprises second pulse width modulation data.

25. The method of claim 24, further comprising synchronizing first pulse width modulation data with the second pulse width modulation data.

26. The method of claim 24, wherein the controller limits the first image data to simple pulse width modulation schemes and uses more complex bit splitting schemes for the second image data.

27. The method of claim 23 wherein each bit duration and split bit duration of the second SLM corresponds to an available bit duration and split bit duration of the first SLM.

28. The method of claim 23, wherein the coding scheme used splits higher bit-depth image data such that each higher bit-depth pixel code of the image data is represented by a lower bit-depth first codeword and a lower bit-depth second codeword, and a combined result from the first and second codewords is equivalent to a higher bit-depth pixel code.

29. The method of claim 28, wherein a first bit-depth of the first codeword matches a first dynamic range of the first SLM and a second bit-depth of the second codeword matches a second dynamic range of the second SLM.

30. A projection system comprising:
(a) a first spatial light modulator (SLM) having a first array of separately addressable pixels, the first SLM adapted to receive light from a light source and to modulate light into a subsequent SLM;
(b) a second SLM having a second array of separately addressable pixels, the second SLM positioned in series with the first SLM to receive modulated light from the first SLM and to direct that light for producing an output; and (c) a controller coupled to the first SLM for delivering first image data having first intensity data for each pixel in the first array to the first SLM, and coupled to the second SLM for delivering second image data having the second image data comprises second intensity data for each pixel in the second array to the second SLM, wherein the first intensity data and the second intensity data are determined in accordance with a bitmap code such that adjacent products of correlated first intensity data and second intensity data differ in quantity approximately in accordance with human ability to detect variations in light intensity levels and the bitmap code correlates first intensity data with second intensity data, the first and second image data being correlated to provide a viewable image at said output.

31. The projection system as claimed in claim 30, wherein the bitmap code is formatted by providing approximately equally spaced brightness levels for the first SLM and selecting code words based on error minimization resulting in a plurality of new code words with a performance equivalent to higher bit depth code words.

* * * * *